United States Patent
Murali et al.

(10) Patent No.: US 12,299,800 B2
(45) Date of Patent: May 13, 2025

(54) COLLISION DETECTION FOR OBJECT REARRANGEMENT USING A 3D SCENE REPRESENTATION

(71) Applicant: NVIDIA Corporation, Santa Clara, CA (US)

(72) Inventors: Adithyavairavan Murali, Seattle, WA (US); Arsalan Mousavian, Seattle, WA (US); Clemens Eppner, Seattle, WA (US); Adam Fishman, Seattle, WA (US); Dieter Fox, Seattle, WA (US)

(73) Assignee: NVIDIA CORPORATION, Santa Clara, CA (US)

( * ) Notice: Subject to any disclaimer, the term of this patent is extended or adjusted under 35 U.S.C. 154(b) by 154 days.

(21) Appl. No.: 18/126,900

(22) Filed: Mar. 27, 2023

(65) Prior Publication Data
US 2024/0177392 A1 May 30, 2024

Related U.S. Application Data

(60) Provisional application No. 63/428,674, filed on Nov. 29, 2022.

(51) Int. Cl.
*G06T 15/00* (2011.01)
*B25J 9/16* (2006.01)
*G06T 9/00* (2006.01)

(52) U.S. Cl.
CPC ............ *G06T 15/00* (2013.01); *B25J 9/1697* (2013.01); *G06T 9/001* (2013.01); *G06T 2210/21* (2013.01)

(58) Field of Classification Search
CPC ........ G06T 15/00; G06T 15/04; G06T 15/08; G06T 15/10; G06T 15/205; G06T 17/00; G06T 17/05; G06T 17/10; G06T 9/001; G06T 2210/21; G06T 19/00; B25J 9/1697; B25J 9/163
See application file for complete search history.

(56) References Cited

U.S. PATENT DOCUMENTS

| 10,417,816 | B2* | 9/2019 | Satzoda | G06F 18/24 |
| 12,094,041 | B2* | 9/2024 | Xu | G06T 7/248 |
| 2023/0019499 | A1* | 1/2023 | Wada | G06V 10/761 |
| 2024/0037825 | A1* | 2/2024 | Xu | G06T 19/00 |

OTHER PUBLICATIONS

Batra et al., "Rearrangement: A Challenge for Embodied AI," arXiv, 2020, 24 pages, retrieved from https://arxiv.org/pdf/2011.01975.pdf.

(Continued)

*Primary Examiner* — Vijay Shankar
(74) *Attorney, Agent, or Firm* — Zilka-Kotab, P.C.

(57) ABSTRACT

One common robotic task is the rearrangement of physical objects situated in an environment. This typically involves a robot manipulator picking up a target object and placing the target object in some target location, such as a shelf, cabinet or cubby, and requires the skills of picking, placing and generating complex collision-free motions, oftentimes in a cluttered environment. The present disclosure provides collision detection for object rearrangement using a three-dimensional (3D) scene representation.

20 Claims, 10 Drawing Sheets

(56) References Cited

OTHER PUBLICATIONS

Garrett et al., "Integrated Task and Motion Planning," Annual Reviews, Annual Review of Control, Robotics, and Autonomous Systems, Feb. 1, 2021, 31 pages.
Srivastava et al., "Combined Task and Motion Planning Through an Extensible Planner-Independent Interface Layer," IEEE International Conference on Robotics and Automation (ICRA), 2014, 8 pages, retrieved from https://people.eecs.berkeley.edu/~russell/papers/icra14-planrob.pdf.
Garrett et al., "Online Replanning in Belief Space for Partially Observable Task and Motion Problems," IEEE International Conference on Robotics and Automation, 2020, 9 pages.
Ehsani et al., "ManipulaTHOR: A Framework for Visual Object Manipulation," CVPR, 2021, pp. 4497-4506.
Szot et al., "Habitat 2.0: Training Home Assistants to Rearrange their Habitat," 35th Conference on Neural Information Processing Systems (NeurIPS 2021), 2021, 16 pages, retrieved from https://proceedings.neurips.cc/paper/2021/file/021bbc7ee20b71134d53e20206bd6feb-Paper.pdf.
Wada et al., "ReorientBot: Learning Object Reorientation for Specific-Posed Placement," IEEE International Conference on Robotics and Automation (ICRA), 2022, 7 pages, retrieved from https://arxiv.org/abs/2202.11092.
Qureshi et al., "NeRP: Neural Rearrangement Planning for Unknown Objects," Robotics: Science and Systems, Jul. 2021, 10 pages.
Murali et al., "6-DOF Grasping for Target-driven Object Manipulation in Clutter," IEEE International Conference onRobotics and Automation (ICRA), 2020, 7 pages, retrieved from https://arxiv.org/abs/1912.03628.
Goyal et al., "IFOR: Iterative Flow Minimization for Robotic Object Rearrangement," CVPR, 2022, 11 pages, retrieved from https://openaccess.thecvf.com/content/CVPR2022/papers/Goyal_IFOR_Iterative_Flow_Minimization_for_Robotic_Object_Rearrangement_CVPR_2022_paper.pdf.
Mahler et al., "Dex-Net 2.0: Deep Learning to Plan Robust Grasps with Synthetic Point Clouds and Analytic Grasp Metrics," Robotics: Science and Systems, Jul. 2017, 10 pages, retrieved from https://www.researchgate.net/publication/319655911_Dex-Net_20_Deep_Learning_to_Plan_Robust_Grasps_with_Synthetic_Point_Clouds_and_Analytic_Grasp_Metrics.
Horst et al., "Best Practices for the Integration of Collaborative Robots into Workcells Within Small and Medium-Sized Manufacturing Operations," NIST Advanced Manufacturing Series 100-41, May 2021, 21 pages.
Mahler et al., "Learning Deep Policies for Robot Bin Picking by Simulating Robust Grasping Sequences," 1st Conference on Robot Learning, 2017, pp. 1-10.
Mousavian et al., "6-DOF GraspNet: Variational Grasp Generation for Object Manipulation," International Conference on Computer Vision, 2019, pp. 2901-2910, retrieved from https://openaccess.thecvf.com/content_ICCV_2019/papers/Mousavian_6-DOF_GraspNet_Variational_Grasp_Generation_for_Object_Manipulation_ICCV_2019_paper.pdf.
Sundermeyer et al., "Contact-GraspNet: Efficient 6-DoF Grasp Generation in Cluttered Scenes," IEEE International Conference on Robotics and Automation (ICRA), Mar. 2021, 7 pages, retrieved from https://www.semanticscholar.org/paper/Contact-GraspNet%3A-Efficient-6-DoF-Grasp-Generation-Sundermeyer-Mousavian/d85d16b003955c6996fafacea7f3c075c531225f.
Danielczuk et al., "Object Rearrangement Using Learned Implicit Collision Functions," IEEE International Conference on Robotics and Automation (ICRA), 2021, 8 pages, retrieved from https://www.semanticscholar.org/paper/Object-Rearrangement-Using-Learned-Implicit-Danielczuk-Mousavian/5f975172aa9088f24236ccc8fe4bfc01ce6fb9b9.
Pan et al., "FCL: A General Purpose Library for Collision and Proximity Queries," IEEE International Conference on Robotics and Automation, May 2012, 9 pages.

Klingensmith et al., "Articulated Robot Motion for Simultaneous Localization and Mapping (ARM-SLAM)," IEEE Robotics and Automation Letters, Author Manuscript, Jul. 2016, 21 pages.
Newcombe et al., "KinectFusion: Real-Time Dense Surface Mapping and Tracking," 10th IEEE International Symposium on Mixed and Augmented Reality (ISMAR), 2011, 10 pages, retrieved from https://www.microsoft.com/en-us/research/wp-content/uploads/2016/02/ismar2011.pdf.
Mildenhall et al., "NeRF: Representing Scenes as Neural Radiance Fields for View Synthesis," Communications of the ACM, vol. 65, Jan. 2022, pp. 99-106.
Kew et al., "Neural Collision Clearance Estimator for Batched Motion Planning," International Workshop on the Algorithmic Foundations of Robotics, Jun. 2021, 16 pages, retrieved from http://robotics.cs.rutgers.edu/wafr2020/wp-content/uploads/sites/7/2020/05/WAFR_2020_FV_8.pdf.
Das et al., "Learning-Based Proxy Collision Detection for Robot Motion Planning Applications," arXiv, 2019, 19 pages, retrieved from https://arxiv.org/abs/1902.08164.
Williams et al., "Model Predictive Path Integral Control: From Theory to Parallel Computation," Journal of Guidance, Control, and Dynamics, vol. 40, No. 2, Feb. 2017, pp. 344-357.
Hubbard, P.M., "Approximating Polyhedra with Spheres for Time-Critical Collision Detection," ACM Transactions on Graphics, vol. 15, No. 3, Jul. 1996, pp. 179-210.
Danielczuk et al., "Segmenting Unknown 3D Objects from Real Depth Images using Mask R-CNN Trained on Synthetic Data," International Conference on Robotics and Automation (ICRA), 2019, 11 pages, retrieved from https://www.semanticscholar.org/paper/Segmenting-Unknown-3D-Objects-from-Real-Depth-using-Danielczuk-Matl/e225629b18a0731ead94eac78fab419017621784.
Labbe et al., "Monte-Carlo Tree Search for Efficient Visually Guided Rearrangement Planning," IEEE Robotics and Automation Letters, 2020, 9 pages, retrieved from https://www.semanticscholar.org/paper/Monte-Carlo-Tree-Search-for-Efficient-Visually-Labb%C3%A9-Zagoruyko/665b89420390a29ac0b6a043df36ae87fab0b65a.
Zeng et al., "Transporter Networks: Rearranging the Visual World for Robotic Manipulation," arXiv, 2020, 21 pages, retrieved from https://arxiv.org/pdf/2010.14406v1.pdf.
Huang et al., "Equivariant Transporter Network," arXiv, 2022, 12 pages, retrieved from https://arxiv.org/abs/2202.09400.
Wu et al., "Transporters with Visual Foresight for Solving Unseen Rearrangement Tasks," arXiv, 2022, 13 pages, retrieved from https://arxiv.org/abs/2202.10765.
Goodwin et al., "Semantically Grounded Object Matching for Robust Robotic Scene Rearrangement," IEEE International Conference on Robotics and Automation (ICRA), May 2022, 7 pages, retrieved from https://ora.ox.ac.uk/objects/uuid:87ad3a09-0505-48dc-805b-2a988779ec04.
Fisher et al., "Example-based Synthesis of 3D Object Arrangements," ACM Transactions on Graphics (TOG), 2012, 11 pages, retrieved from https://graphics.stanford.edu/projects/scenesynth/.
Majerowicz et al., "Filling Your Shelves: Synthesizing Diverse Style-Preserving Artifact Arrangements," IEEE Transactions on Visualization and Computer Graphics, 2013, 14 pages, retrieved from https://faculty.runi.ac.il/arik/site/includes/papers/arrangement-final.pdf.
Yu et al., "The Clutterpalette: An Interactive Tool for Detailing Indoor Scenes." IEEE Transactions on Visualization and Computer Graphics, 2015, 11 pages, retrieved from https://www.saikit.org/static/projects/clutterPalette/clutterpalette.pdf.
Deitke et al., "ProcTHOR: Large-Scale Embodied AI Using Procedural Generation," arXiv, 2022, 53 pages, retrieved from https://arxiv.org/abs/2206.06994.
Kar et al., "Meta-Sim: Learning to Generate Synthetic Datasets," ICCV, 2019, pp. 4551-4560, retrieved from https://openaccess.thecvf.com/content_ICCV_2019/papers/Kar_Meta-Sim_Learning_to_Generate_Synthetic_Datasets_ICCV_2019_paper.pdf.
Eppner et al., "ACRONYM: A Large-Scale Grasp Dataset Based on Simulation," IEEE International Conference on Robotics and Automation (ICRA), Nov. 2020, 6 pages, retrieved from https://www.semanticscholar.org/paper/ACRONYM%3A-A-Large-Scale-Grasp-

(56) References Cited

OTHER PUBLICATIONS

Dataset-Based-on-Eppner-Mousavian/ff0282b34d758a4aaad524ea554f6545852e3c68.

Chang et al., "ShapeNet: An Information-Rich 3D Model Repository," arXiv, 2015, 11 pages, retrieved from https://arxiv.org/abs/1512.03012.

Qi et al., "PointNet++: Deep Hierarchical Feature Learning on Point Sets in a Metric Space," 31st Conference on Neural Information Processing Systems (NIPS 2017), 2017, 10 pages, retrieved from https://proceedings.neurips.cc/paper_files/paper/2017/file/d8bf84be3800d12174d8b05e9b89836f-Paper.pdf.

Goodfellow et al., "Generative Adversarial Nets," Neural Information Processing Systems, 2014, pp. 1-9, retrieved from https://papers.nips.cc/paper_files/paper/2014/file/5ca3e9b122f61f8f06494c97b1afccf3-Paper.pdf.

Li et al., "Implicit Maximum Likelihood Estimation," arXiv, 2018, 21 pages, retrieved from https://arxiv.org/abs/1809.09087.

Chitta et al., "Moveit!," ROS Topics, IEEE Robotics & Automation Magazine, Mar. 2012, pp. 18-19.

Chamzas et al., "Motionbenchmaker: A Tool to Generate and Benchmark Motion Planning Datasets," IEEE Robotics and Automation Letters, 2021, pp. 1-8.

Hornung et al., "OctoMap: An Efficient Probabilistic 3D Mapping Framework Based on Octrees," Autonomous Robots, 2013, 17 pages.

Zhou et al., "Open3D: A Modern Library for 3D Data Processing," arXiv, 2018, 6 pages, retrieved from https://arxiv.org/abs/1801.09847.

Tsang et al., "Kaolin: A Pytorch Library for Accelerating 3D Deep Learning Research," GitHub, 2022, 6 pages, retrieved from http://web.archive.org/web/20220917025230/https://github.com/NVIDIAGameWorks/kaolin.

Wyk et al., "Geometric Fabrics: Generalizing Classical Mechanics to Capture the Physics of Behavior," preprint for IEEE Robotics and Automation Letters, Jan. 2022, pp. 1-19.

* cited by examiner

COLLISION DETECTION FOR OBJECT REARRANGEMENT USING A 3D SCENE REPRESENTATION

RELATED APPLICATION(S)

This application claims the benefit of U.S. Provisional Application No. 63/428,674, titled "SCALING OBJECT REARRANGEMENT WITH PROCEDURAL CLUTTERED SCENE GENERATION" and filed Nov. 29, 2022, the entire contents of which is incorporated herein by reference.

TECHNICAL FIELD

The present disclosure relates to object rearrangement tasks for robotics.

BACKGROUND

One task commonly performed by robots is the rearrangement of physical objects situated in an environment. This typically includes a robot manipulator picking up a target object and placing the target object in some target location, such as a shelf, cabinet or cubby. The difficulty of this task is increased when the environment is cluttered with other objects, and particularly when the cluttered environment is unknown (i.e. has not yet been "learned" using artificial intelligence). This is because the rearrangement task requires the skills of picking, placing and generating complex collision-free motions in a cluttered environment.

Unfortunately, existing solutions aimed to address this problem exhibit various limitations. For example, while methods from the Task-and-motion-planning (TAMP) literature can accomplish robotic object rearrangement, they require complete object and world state information (i.e. complete geometric models) and hence these methods do not generalize to unknown scenes. However, this requirement is hard to realize in the real world since creation of these geometric models is costly in terms of time and resources. As another example, recent neural rearrangement methods, which are able to generalize from sensed observations without requiring state information, however, these methods are limited to a specific type of scene that is not densely cluttered.

There is a need for addressing these issues and/or other issues associated with the prior art.

SUMMARY

A method, computer readable medium, and system are disclosed to provide collision detection for object rearrangement using a three-dimensional (3D) scene representation. At least one image of a scene having a plurality of objects is processed to learn a three-dimensional representation of the scene. Collision detection is performed for at least a portion of the scene, using the three-dimensional representation of the scene, to sample a target object from the plurality of objects. A plurality of waypoints in the scene are predicted for a rearrangement task corresponding to the target object, using the three-dimensional representation of the scene.

DETAILED DESCRIPTION

Figure 1:
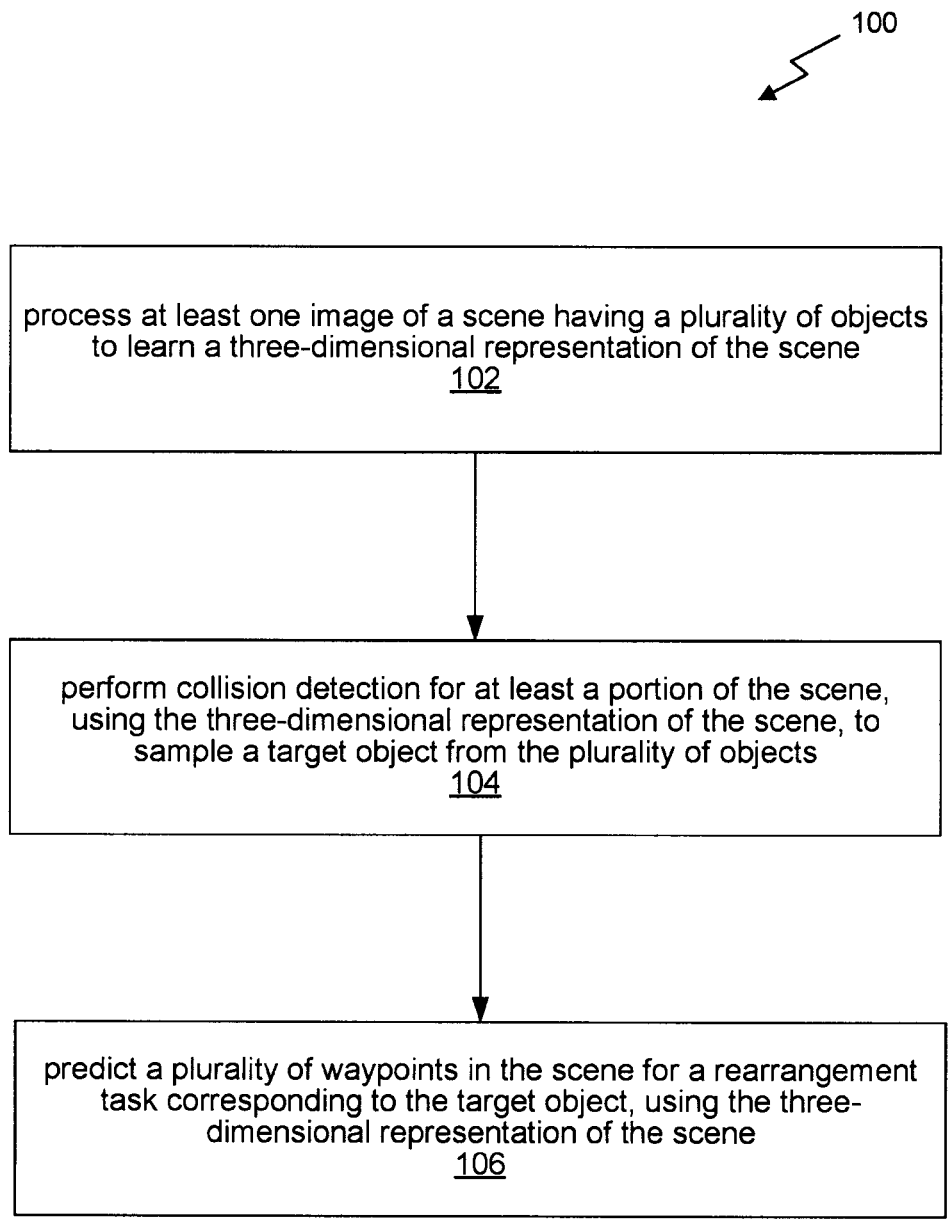
FIG. 1 illustrates a method for collision detection for object rearrangement using a three-dimensional (3D) scene representation, in accordance with an embodiment.

FIG. 1 illustrates a method 100 for collision detection for object rearrangement using a 3D scene representation, in accordance with an embodiment. The method 100 may be performed by a device, which may be comprised of a processing unit, a program, custom circuitry, or a combination thereof, in an embodiment. In another embodiment a system comprised of a non-transitory memory storage comprising instructions, and one or more processors in communication with the memory, may execute the instructions to perform the method 100. In another embodiment, a non-transitory computer-readable media may store computer instructions which when executed by one or more processors of a device cause the device to perform the method 100.

In operation 102, at least one image of a scene having a plurality of objects is processed to learn a 3D representation of the scene. With respect to the present embodiment, the scene is any environment having at least one physical object capable of being grasped by a robotic gripper and at least one physical object on which the graspable object is capable of being placed (e.g. a tabletop, cabinet, shelf, etc.). In an embodiment, the method 100 may learn the 3D representation of the scene from a single image of the scene. In another embodiment, the method 100 may learn the 3D representation of the scene from a plurality of images of the scene. The images may be captured by one or more cameras and from one or more viewpoints.

Additionally, the 3D representation of the scene that is learned from the image(s) may be in any defined format that indicates, in 3D, features of the scene. Thus, the process by which the 3D representation is learned from the image(s) may be configured accordingly. In an embodiment, the 3D representation of the scene may be an implicit 3D encoding of a point cloud for the scene.

For example, in an embodiment, the image(s) may be processed to generate a point cloud for the scene. In an embodiment, the point cloud for the scene may be encoded to learn the 3D representation of the scene. In an embodiment, the point cloud for the scene may be encoded by voxelizing the point cloud for the scene into a plurality of voxels. In an embodiment, the point cloud for the scene may be encoded by applying 3D convolutions to the plurality of voxels. Applying the 3D convolutions may result in the 3D representation of the scene that defines the features of the scene.

In operation 104, collision detection is performed for at least a portion of the scene, using the 3D representation of the scene, to sample a target object from the plurality of objects. With respect to the present description, collision detection refers to a process that detects, or in other words predicts, the intersection of two or more objects (one of which may be an element of the scene, such as a support surface). In operation 104, the collision detection will detect intersections between two or more of the objects in the scene. Intersections may be defined as those having a distance of zero between the two or more objects, or those having some other defined distance (greater than zero) between the two or more objects.

As noted, the collision detection is performed for at least a portion of the scene. This means that the collision detection may be performed for one or more defined portions of the scene that are of interest (i.e. for an object rearrangement task), in an embodiment. In another possible embodiment, the collision detection may be performed for an entirety of the scene.

In an embodiment, the collision detection may be performed using a learned collision model. The collision model may be learned from training data that includes a plurality of scenes having: a plurality of different objects, a plurality of different object placements, and a plurality of different support surfaces. These scenes included in the training data may be procedurally generated, as described in more detail below with respect to the subsequent Figures.

In an embodiment, the collision detection may be performed also using a 3D representation of each of the objects included in the scene, or the portion thereof. The 3D representation of each object may be learned by processing the at least one image of the scene. In an embodiment, learning the 3D representation of each object may include encoding a point cloud for each object.

As mentioned above, the collision detection is performed to sample a target object from the objects in the scene. Sampling a target object refers to selecting an object from among the objects in the scene. It should be noted that any defined criteria may be used to sample a target object from the scene, so long as the criteria relies, at least in part, on a result of the collision detection. In an embodiment, the target object may be sampled from the plurality of objects in the scene when it is determined, based on the collision detection, that there exists a set of ground truth robotic grasps associated with the target object which do not collide with an environment of the target object and which have valid collision-free inverse kinematic configuration.

In operation 106, a plurality of waypoints in the scene are predicted for a rearrangement task corresponding to the target object, using the 3D representation of the scene. With respect to the present description, a waypoint refers to a point along a path. Also with respect to the present description, the rearrangement task refers to changing a physical position (e.g. location and/or orientation) of an object in a scene. In operation 106, the waypoints are predicted for rearranging the target object in the scene, and thus represent a path to take to rearrange (i.e. move) the target object in the scene.

In an embodiment, the rearrangement task includes using a robotic gripper to move the target object from a source location in the scene to a target location in the scene. In an embodiment, the target location in the scene may be a location in the scene for which there exists a collision-free placement pose for the target object. Thus, the target location in the scene may be sampled from a plurality of possible destination locations when there exists, at the target location, a collision-free placement pose for the target object.

In an exemplary embodiment, the source location in the scene may be a first support surface and the target location in the scene may be a second support surface that is different from the first support surface. The first support surface and/or the second support surface may be a shelf, in an embodiment. Of course, other possible support surfaces include tables, cabinets, and/or any other surface capable of having the target object placed (and supported) thereon.

In an embodiment, the rearrangement task includes a defined placement orientation of the target object at the target location. In an embodiment, the defined placement orientation is set to a current pose of the target object at the source location. Of course, in other embodiments the defined placement orientation may be configured to be a pose other than the current pose of the target object at the source location.

In an embodiment, the plurality of waypoints may be predicted using a feedforward neural network that processes: the rearrangement task corresponding to the target object, the 3D representation of the scene, and a current position of a robotic gripper to be used for the rearrangement task. In an embodiment, the plurality of waypoints may be sampled based on a defined signed distance value. The defined signed distance value may ensure that the waypoints represent a collision-free path for the rearrangement task.

In an embodiment, the method 100 may further include causing a robot to perform the rearrangement task according to the plurality of waypoints. To this end, the method 100 may enable object rearrangement (e.g. by a robot) based upon collision detection that relies on a 3D scene representation, as described above. Further embodiments will now be provided in the description of the subsequent figures. It should be noted that the embodiments disclosed herein with reference to the method 100 of FIG. 1 may apply to and/or be used in combination with any of the embodiments of the remaining figures below.

Figure 2:
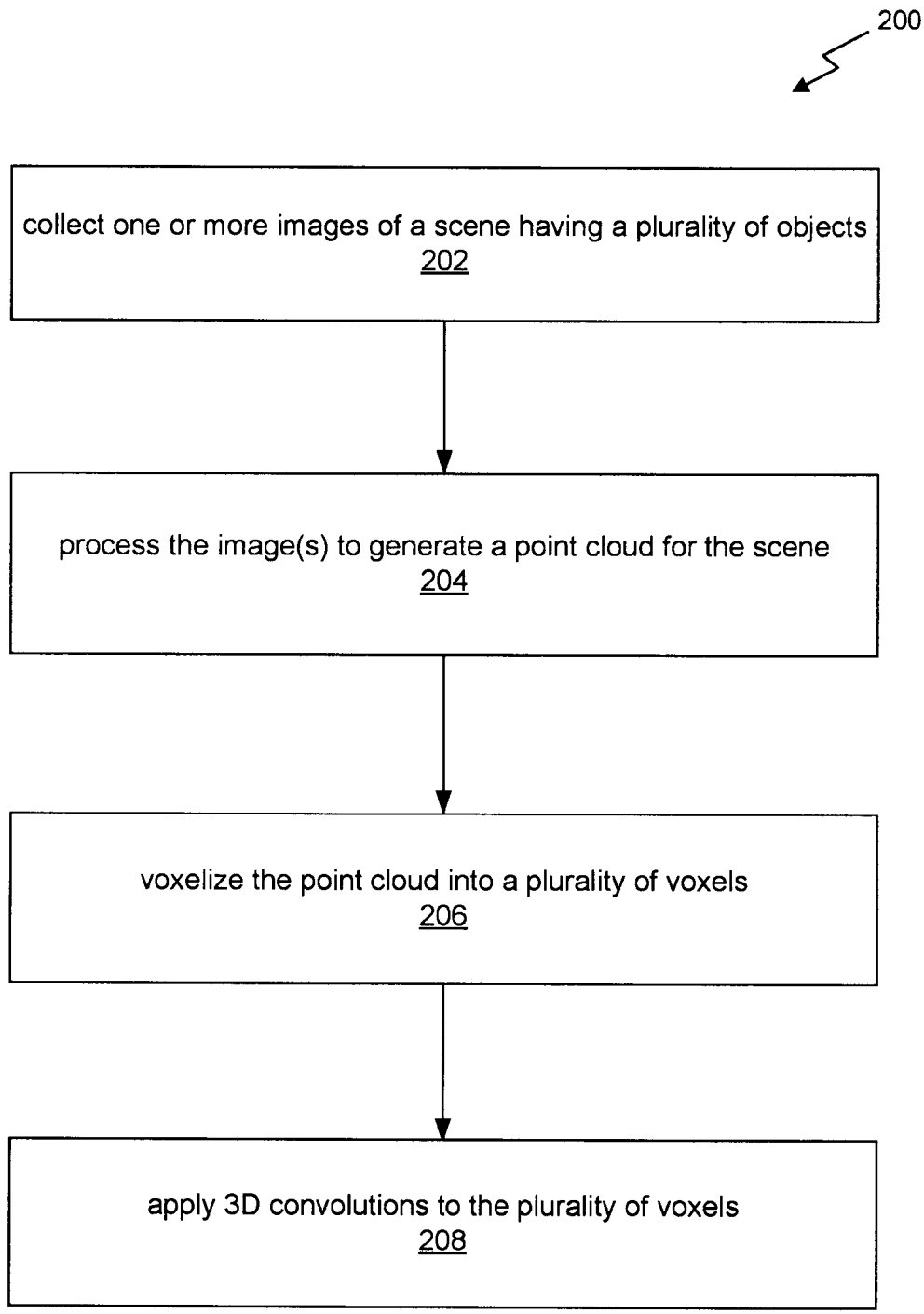
FIG. 2 illustrates a method for generating a 3D scene representation, in accordance with an embodiment.

FIG. 2 illustrates a method 200 for generating a 3D scene representation, in accordance with an embodiment. In an embodiment, the method 200 may be performed for generating the 3D representation of the scene used in the method 100 of FIG. 1.

In operation 202, one or more images of a scene are collected, wherein the scene includes a plurality of objects. The objects include at least one graspable object and at least one support surface. The images may be captured by one or more cameras situated in one or more different locations with respect to the scene (thereby capturing different perspectives of the scene).

In operation 204, the image(s) are processed to generate a point cloud for the scene. The point cloud refers to a plurality of points plotted in 3D space to represent the scene. In an embodiment, the point cloud for the scene may exclude a robot included in the scene.

In operation 206, the point cloud for the scene is voxelized into a plurality of voxels. In operation 208, 3D convolutions are applied to the plurality of voxels. A result of the method 200 is a 3D encoding of the scene features, and is in particular a 3D representation of the scene.

Figure 3:
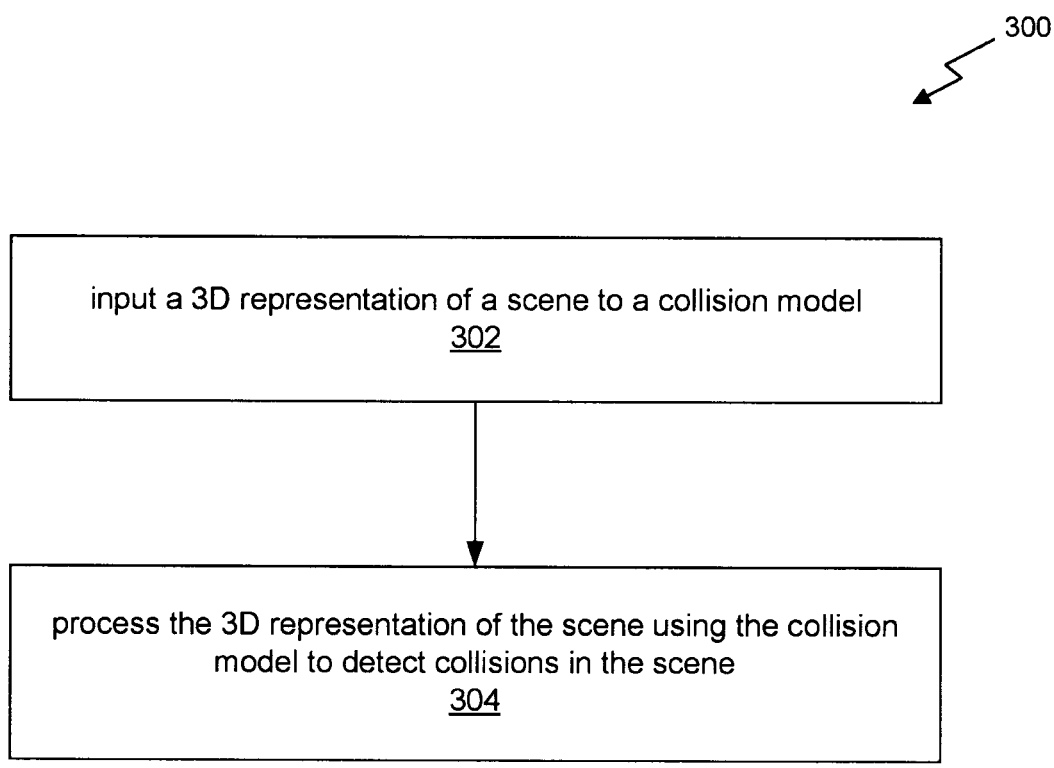
FIG. 3 illustrates a method for collision detection, in accordance with an embodiment.

FIG. 3A illustrates a method 300 for collision detection, in accordance with an embodiment. In an embodiment, the method 300 may be performed to carry out operation 104 of FIG. 1.

In operation 302, a 3D representation of a scene is input to a collision model. The 3D representation of the scene may be generated according to the method 200 of FIG. 2, in an embodiment. In any case, the scene includes a plurality of objects.

The collision model is a machine learning model trained to detect collisions in the scene. The collisions refer to intersections between two or more objects in the scene (one of which may be an element of the scene, such as a support surface). In an embodiment, the collision model is trained using a training data set. In an embodiment, the training data set includes images of cluttered scenes that have been procedurally generated.

To generate the cluttered scenes, a set of environment assets $\mathcal{E}$, object assets O and fixed robot manipulator R (Franka Panda in one embodiment) are assembled, in an embodiment. The environment assets $\mathcal{E}$ include a shelf, cubby, cabinet, drawer and table. All the assets are procedurally generated with the exception of shelves. For shelves, the shelf categories may be aggregated from ShapeNetCore and then filter to remove those assets which cannot be made watertight or if proper support surfaces cannot be extracted. The object assets O for training may come from ACRONYM, which contains a wide range of object geometries from 262 categories as well as high-quality SE(3) grasps which can be used for picking (grasping) objects.

A probabilistic grammar P dictates how the assets can be organized into random scene graphs $S \sim P(\mathcal{E}, O, R)$. In an embodiment, this grammar is composed of the following key components: 1) sampling potential supports surfaces $\gamma$ in an environment asset to place objects, 2) rejection sampling to sequentially place objects on these surfaces without colliding with the scene, and 3) fixing the robot base in a region where there is sufficient intersection over union (e.g. IoU>0.8) between the workspace of the robot (approximated by a cuboid volume) and $\gamma$. Once the scene S is generated, collision queries are sampled with free-floating object meshes (computed in a straight-line trajectory) and the scene. Thus, the object placements on all the environments, including the shelves, are procedurally generated. Synthetic point clouds X are rendered online during training.

By scaling up the training data to a more diverse set of environments (including shelves, cabinets, etc.) beyond just a tabletop, the model generalizes to different type of scenes. In an embodiment, the model is trained with binary cross entropy loss and with stochastic gradient descent (SGD) with constant learning rate.

Returning to operation 302, a 3D representation of objects in the scene may also be input to the collision model. The 3D representation of objects may be generated from an object point cloud. The object point cloud may be generated from given image(s) of the scene.

In operation 304, the 3D representation of the scene is processed using the collision model to detect collisions in the scene. In an embodiment, the model includes a multi-layer perceptron (MLP) binary classifier $c=g_\theta(\psi_S, \psi_O, T_{O \to S})$ that predicts if the object collides with the scene, where $T_{O \to S}$ is the relative transformation between the object and the scene and $\psi_O$ are the encoded object features (e.g. encoded with PointNet++ layers akin).

Figure 4:
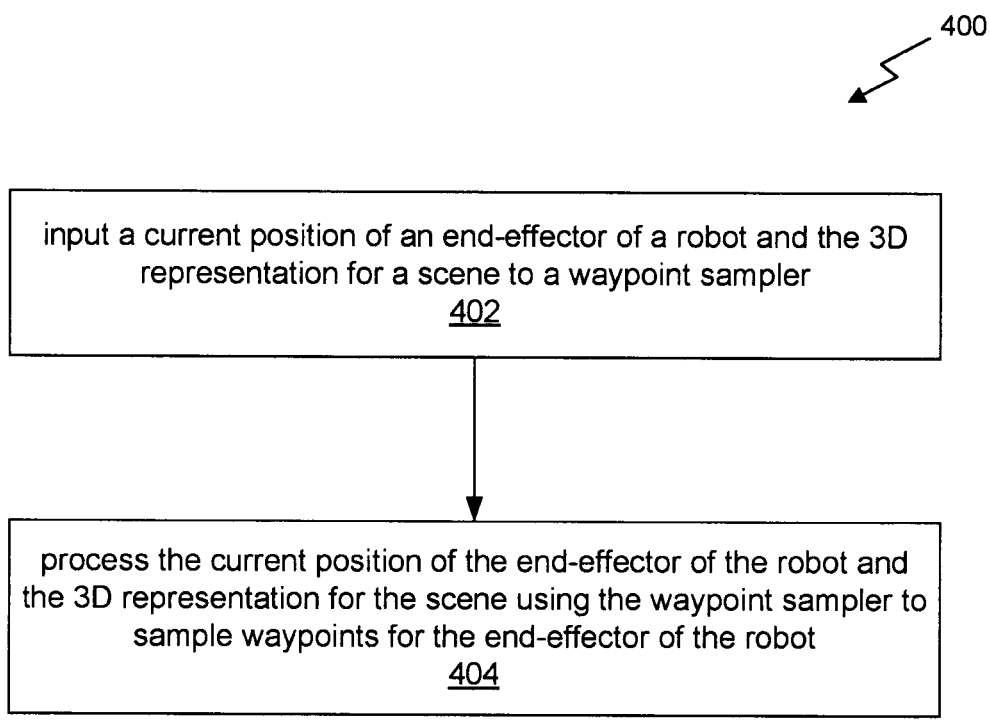
FIG. 4 illustrates a method for waypoint prediction, in accordance with an embodiment.

FIG. 4 illustrates a method 400 for waypoint prediction, in accordance with an embodiment. In an embodiment, the method 400 may be performed to carry out operation 106 of FIG. 1.

In operation 402, a current position of an end-effector (i.e. gripper) of a robot and a 3D representation for a scene are input to a waypoint sampler. The waypoint sampler is modelled as a conditional generator, as described below.

In operation 404, the waypoint sampler processes the current position of the end-effector of the robot and the 3D representation for the scene to sample waypoints for the end-effector of the robot, including waypoints that get the robot out of tight spaces. In an embodiment, the waypoint sampler also processes a latent vector z, which may be configured to have two dimensions as described below.

More formally, the waypoints $w \in \mathbb{R}^3$ are defined as to be in the set $\{w | \tau_{min} \leq \tau_{max} \cap \|w - P_{gripper}\| \leq D\}$, where S is the scene mesh, and $p_{gripper}$ is the end-effector position. The waypoint sampler is modelled as a conditional generator $\hat{w} = f_\theta(\psi_S, p_{gripper}, z)$ as in Generative Adversarial Networks. Instead of using adversarial training, the sampler is trained with Implicit Maximum Likelihood Estimation (IMLE) which attempts to make each generated sample similar to a ground truth sample. Making the loss bidirectional improves the generated samples—enforcing that ground truth samples are also similar to the set of nearest predicted samples. In Equation 1 below, let $z_1, \ldots, z_m \sim N(0, I)$ denote randomly sampled latent input noise vectors and $w_i$ the ground truth waypoints.

$$\mathcal{L}_{IMLE} = \frac{1}{n} \sum_{i=1}^{n} \min_j |\hat{w}_j - w_i| \qquad \text{Equation 1}$$

Figure 5:
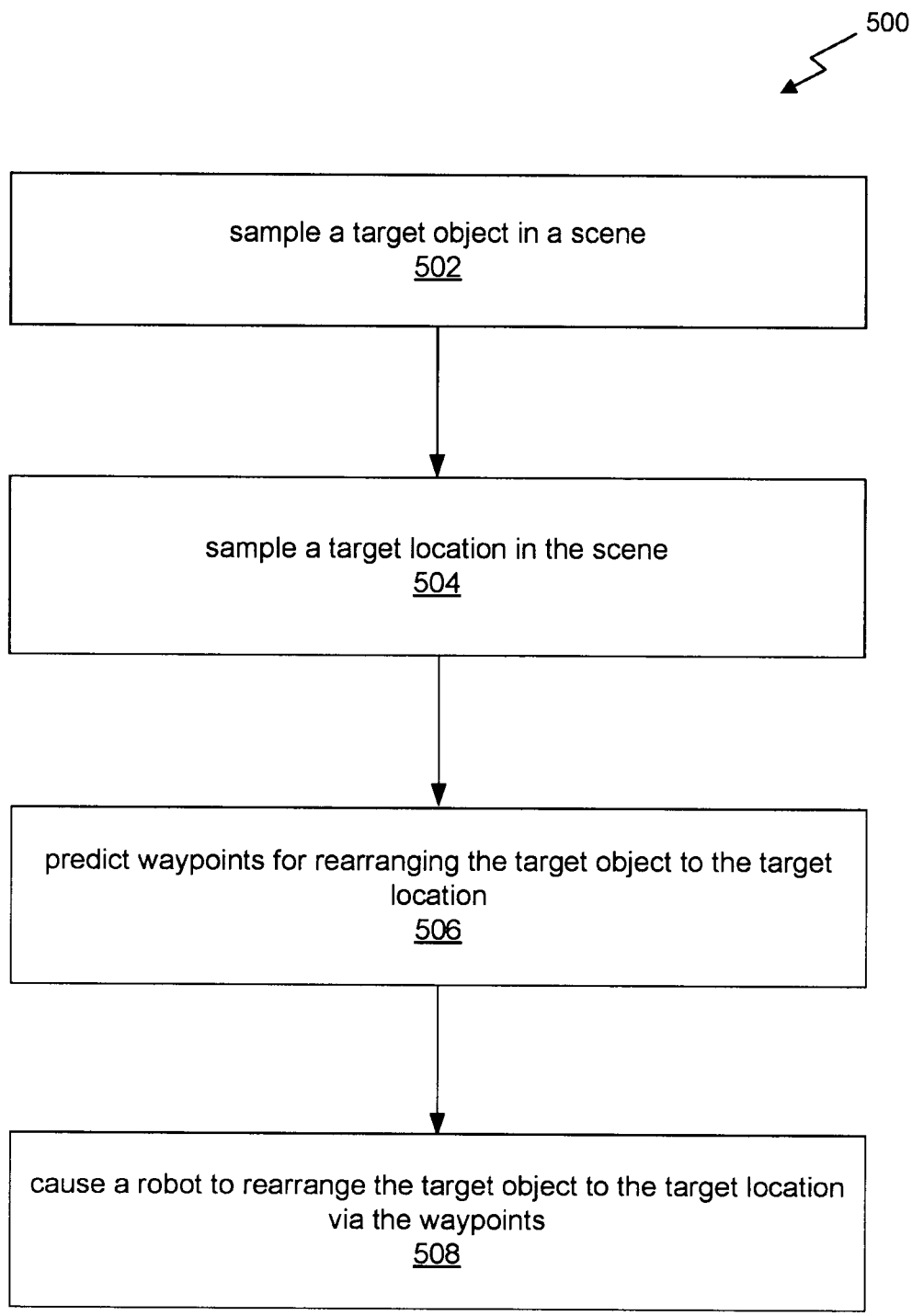
FIG. 5 illustrates a method for object rearrangement, in accordance with an embodiment.

FIG. 5 illustrates a method 500 for object rearrangement, in accordance with an embodiment.

In operation 502, a target object in a scene is sampled. The target object refers to an object in the scene that is capable of being grasped by an end-effector of a robot and rearranged (i.e. moved) in the scene. In an embodiment, a classification of the object (as determined based on features of the object) may indicate that the object meets the criteria of being graspable and moveable.

In an embodiment, the target object is sampled based on collision detection performed for the scene. The collision detection may be performed according to the method 300 of FIG. 3. In an embodiment, the target object is sampled from other objects in the scene when it is determined, based on a result of the collision detection, that there exists a set of ground truth grasps of the end-effector that are associated with the target object where they do not collide with the environment (i.e. other objects in the scene) and where they have valid collision free inverse kinematic configuration.

In operation 504, a target location in the scene is sampled. The target location refers to an area on a support surface in the scene (e.g. a shelf) for which there exists a collision free placement pose for the target object. The placement pose may include a placement orientation of the target object, which may be a current pose of the target object (at its source location). The target location may be sampled from other locations in the scene based on a point cloud for the scene and the support surface. The target location may be different from the current (source) location of the target object in the scene.

In operation 506, waypoints are predicted for rearranging the target object to the target location. The waypoints may be predicted according to the method 400 of FIG. 4. In an embodiment, the waypoints may be sampled with a defined signed distance value (i.e. to ensure a collision free path for rearranging the target object to the target location).

In operation 508, a robot is caused to rearrange the target object to the target location via the waypoints. In an embodiment, instructions may be sent to the robot to cause the robot to rearrange the target object to the target location via the waypoints. The instructions may be in the form of computer code that is executable by the robot to cause the robot to rearrange the target object to the target location via the waypoints.

Figure 6:
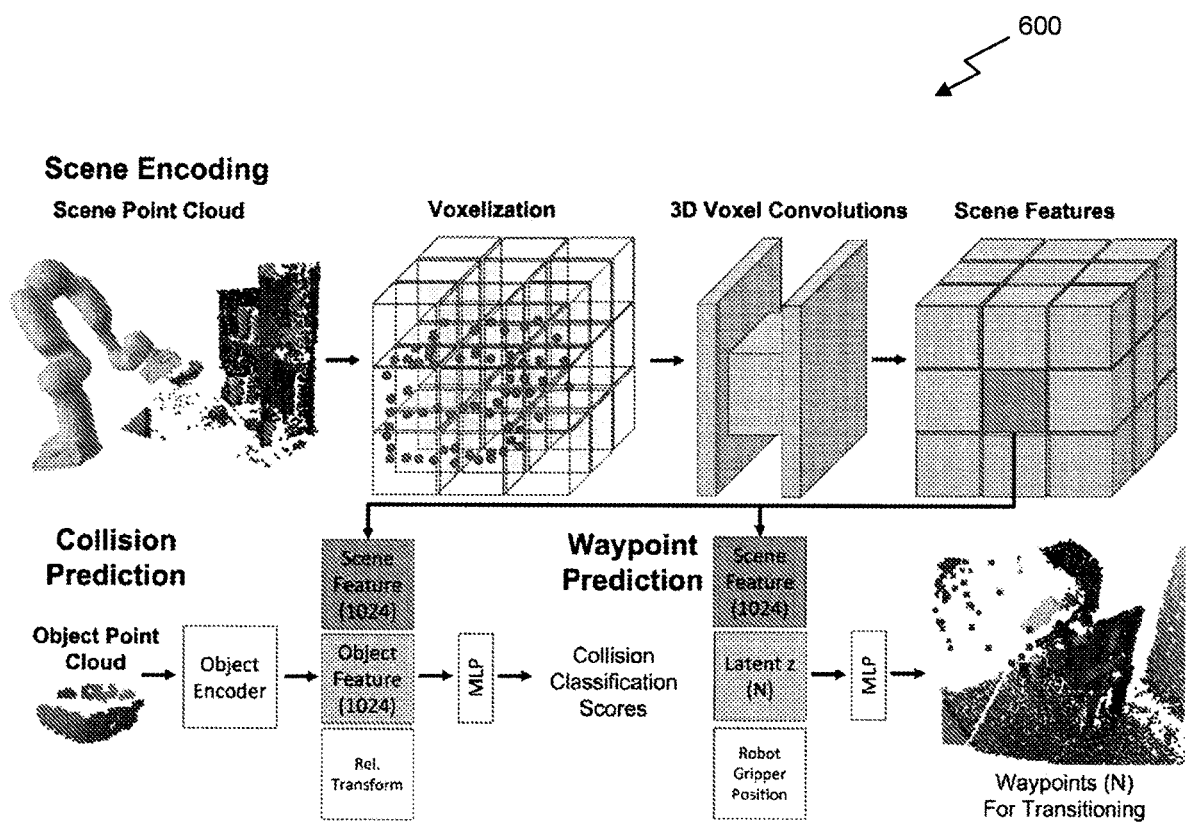
FIG. 6 illustrates a flow diagram of a system for using a 3D scene representation for collision detection and waypoint prediction, in accordance with an embodiment.

FIG. 6 illustrates a flow diagram of a system 600 for using a 3D scene representation for collision detection and waypoint prediction, in accordance with an embodiment. The system 600 may perform both the collision detection method 300 of FIG. 3 and the waypoint prediction method 400 of FIG. 4.

The system 600 first encodes the scene point cloud with voxelization and 3D convolutions, to form a 3D representation of the scene (shown as "Scene Feature"). It should be noted that the robot is only used for visualization and the robot point cloud is removed from the scene in practice. The system 600 also encodes an object point cloud, to form a 3D representation of an object (shown as "Object Feature").

The scene features are then used with the object features to predict scene-object collision queries (shown as "Collision Classification Scores"). Further, the system 600 predicts waypoints for rearrangement, based on the scene features. As shown, the waypoint prediction is conditioned on a latent vector z and a current gripper position.

Machine Learning

Deep neural networks (DNNs), including deep learning models, developed on processors have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions. Inferencing is less compute-intensive than training, being a latency-sensitive process where a trained neural network is applied to new inputs it has not seen before to classify images, translate speech, and generally infer new information.

Inference and Training Logic

As noted above, a deep learning or neural learning system needs to be trained to generate inferences from input data. Details regarding inference and/or training logic 715 for a deep learning or neural learning system are provided below in conjunction with FIGS. 7A and/or 7B.

In at least one embodiment, inference and/or training logic 715 may include, without limitation, a data storage 701 to store forward and/or output weight and/or input/output data corresponding to neurons or layers of a neural network trained and/or used for inferencing in aspects of one or more embodiments. In at least one embodiment data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of data storage 701 may be included with other on-chip or off-chip data storage, including a processor's L1, L2, or L3 cache or system memory.

In at least one embodiment, any portion of data storage 701 may be internal or external to one or more processors or other hardware logic devices or circuits. In at least one embodiment, data storage 701 may be cache memory, dynamic randomly addressable memory ("DRAM"), static randomly addressable memory ("SRAM"), non-volatile memory (e.g., Flash memory), or other storage. In at least one embodiment, choice of whether data storage 701 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a data storage 705 to store backward and/or output weight and/or input/output data corresponding to neurons or layers of a neural network trained and/or used for inferencing in aspects of one or more embodiments. In at least one embodiment, data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, any portion of data storage 705 may be included with other on-chip or off-chip data storage, including a processor's L1, L2, or L3 cache or system memory. In at least one embodiment, any portion of data storage 705 may be internal or external to on one or more processors or other hardware logic devices or circuits. In at least one embodiment, data storage 705 may be cache memory, DRAM, SRAM, non-volatile memory (e.g., Flash memory), or other storage. In at least one embodiment, choice of whether data storage 705 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, data storage 701 and data storage 705 may be separate storage structures. In at least one embodiment, data storage 701 and data storage 705 may be same storage structure. In at least one embodiment, data storage 701 and data storage 705 may be partially same storage structure and partially separate storage structures. In at least one embodiment, any portion of data storage 701 and data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710 to perform logical and/or mathematical operations based, at least in part on, or indicated by, training and/or inference code, result of which may result in activations (e.g., output values from layers or neurons within a neural network) stored in an activation storage 720 that are functions of input/output and/or weight parameter data stored in data storage 701 and/or data storage 705. In at least one embodiment, activations stored in activation storage 720 are generated according to linear algebraic and or matrix-based mathematics performed by ALU(s) 710 in response to performing instructions or other code, wherein weight values stored in data storage 705 and/or data 701 are used as operands along with other values, such as bias values, gradient information, momentum values, or other parameters or hyperparameters, any or all of which may be stored in data storage 705 or data storage 701 or another storage on or off-chip. In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALUs 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, data storage 701, data storage 705, and activation storage 720 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., Flash memory), or other storage. In at least one embodiment, activation storage 720 may be completely or partially within or external to one or more processors or other logical circuits. In at least one embodiment, choice of whether activation storage 720 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 715 illustrated in FIG. 7A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7A may be used in conjunction with central processing unit ("CPU") hardware, graphics processing unit ("GPU") hardware or other hardware, such as field programmable gate arrays ("FPGAs").

Figure 7A:
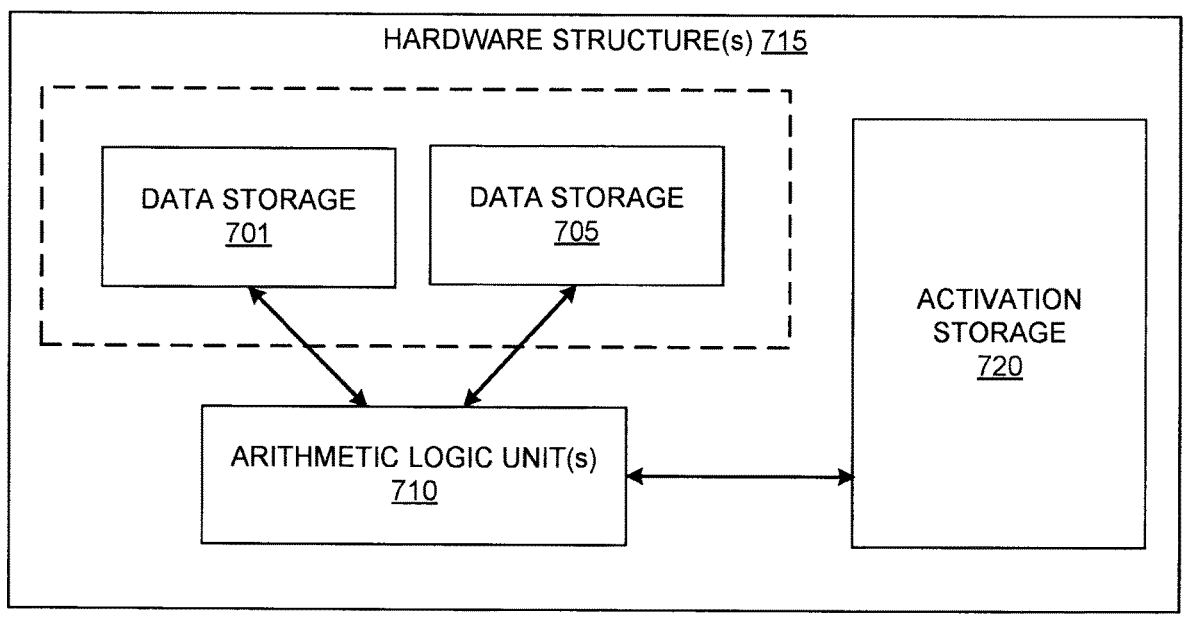
FIG. 7A illustrates inference and/or training logic, according to at least one embodiment.
Figure 7B:
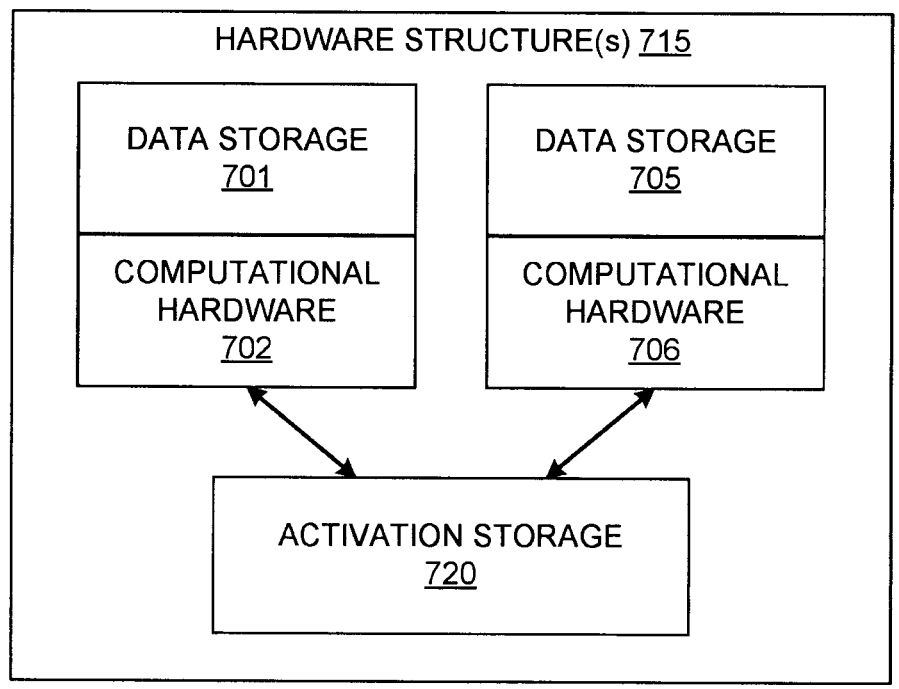
FIG. 7B illustrates inference and/or training logic, according to at least one embodiment.

FIG. 7B illustrates inference and/or training logic 715, according to at least one embodiment. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7B may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, data storage 701 and data storage 705, which may be used to store weight values and/or other information, including bias values, gradient information, momentum values, and/or other parameter or hyperparameter information. In at least one embodiment illustrated in FIG. 7B, each of data storage 701 and data storage 705 is associated with a dedicated computational resource, such as computational hardware 702 and computational hardware 706, respectively. In at least one embodiment, each of computational hardware 706 comprises one or more ALUs that perform mathematical functions, such as linear algebraic functions, only on information stored in data storage 701 and data storage 705, respectively, result of which is stored in activation storage 720.

In at least one embodiment, each of data storage 701 and 705 and corresponding computational hardware 702 and 706, respectively, correspond to different layers of a neural network, such that resulting activation from one "storage/ computational pair 701/702" of data storage 701 and computational hardware 702 is provided as an input to next "storage/computational pair 705/706" of data storage 705 and computational hardware 706, in order to mirror conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage computation pairs 701/702 and 705/706 may be included in inference and/or training logic 715.

Neural Network Training and Deployment

Figure 8:
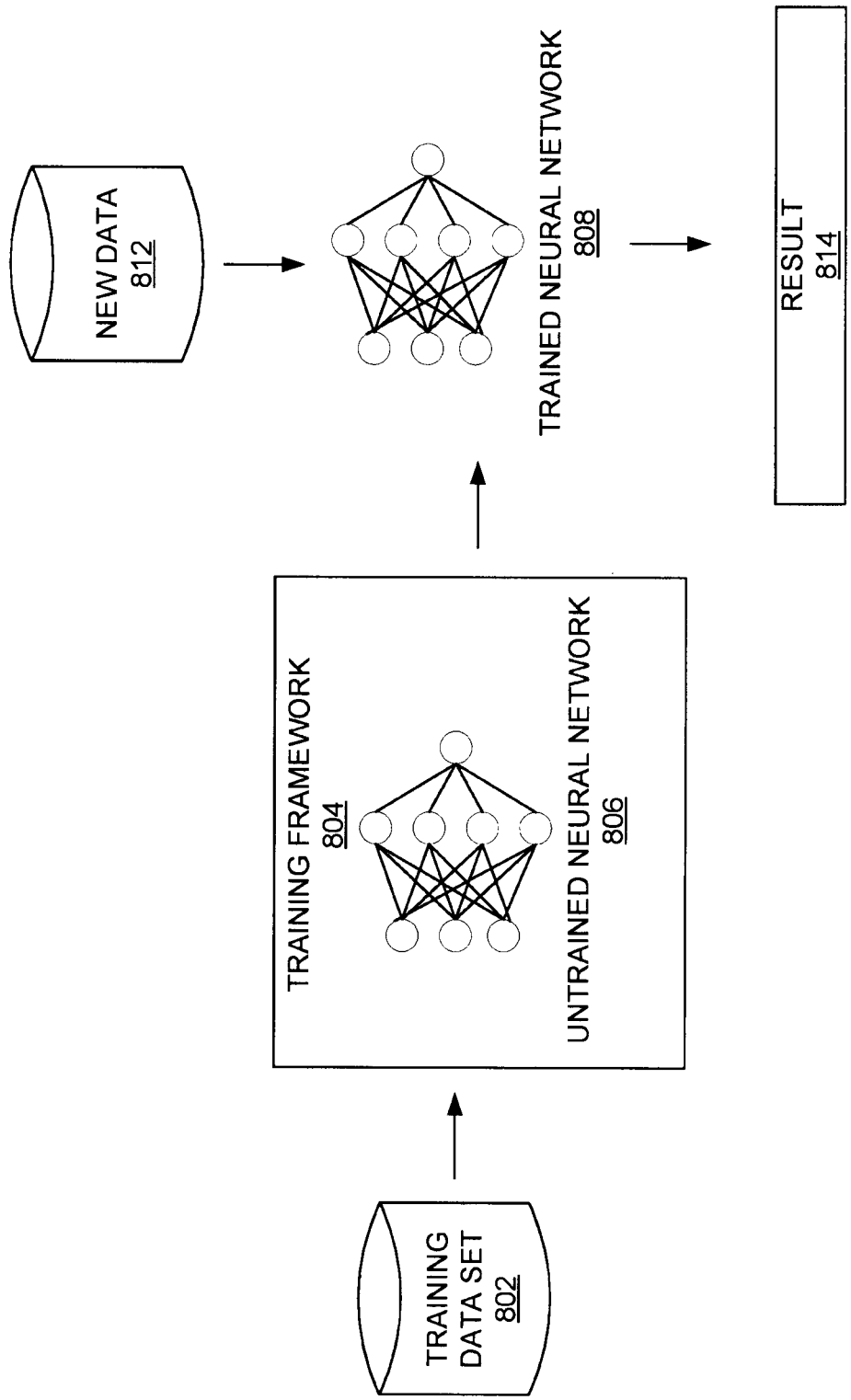
FIG. 8 illustrates training and deployment of a neural network, according to at least one embodiment.

FIG. 8 illustrates another embodiment for training and deployment of a deep neural network. In at least one embodiment, untrained neural network 806 is trained using a training dataset 802. In at least one embodiment, training framework 804 is a PyTorch framework, whereas in other embodiments, training framework 804 is a Tensorflow, Boost, Caffe, Microsoft Cognitive Toolkit/CNTK, MXNet, Chainer, Keras, Deeplearning4j, or other training framework. In at least one embodiment training framework 804 trains an untrained neural network 806 and enables it to be trained using processing resources described herein to generate a trained neural network 808. In at least one embodiment, weights may be chosen randomly or by pre-training using a deep belief network. In at least one embodiment, training may be performed in either a supervised, partially supervised, or unsupervised manner.

In at least one embodiment, untrained neural network 806 is trained using supervised learning, wherein training dataset 802 includes an input paired with a desired output for an input, or where training dataset 802 includes input having known output and the output of the neural network is manually graded. In at least one embodiment, untrained neural network 806 is trained in a supervised manner processes inputs from training dataset 802 and compares resulting outputs against a set of expected or desired outputs. In at least one embodiment, errors are then propagated back through untrained neural network 806. In at least one embodiment, training framework 804 adjusts weights that control untrained neural network 806. In at least one embodiment, training framework 804 includes tools to monitor how well untrained neural network 806 is converging towards a model, such as trained neural network 808, suitable to generating correct answers, such as in result 814, based on known input data, such as new data 812. In at least one embodiment, training framework 804 trains untrained neural network 806 repeatedly while adjust weights to refine an output of untrained neural network 806 using a loss function and adjustment algorithm, such as stochastic gradient descent. In at least one embodiment, training framework 804 trains untrained neural network 806 until untrained neural network 806 achieves a desired accuracy. In at least one embodiment, trained neural network 808 can then be deployed to implement any number of machine learning operations.

In at least one embodiment, untrained neural network 806 is trained using unsupervised learning, wherein untrained neural network 806 attempts to train itself using unlabeled data. In at least one embodiment, unsupervised learning training dataset 802 will include input data without any associated output data or "ground truth" data. In at least one embodiment, untrained neural network 806 can learn groupings within training dataset 802 and can determine how individual inputs are related to untrained dataset 802. In at least one embodiment, unsupervised training can be used to generate a self-organizing map, which is a type of trained neural network 808 capable of performing operations useful in reducing dimensionality of new data 812. In at least one embodiment, unsupervised training can also be used to perform anomaly detection, which allows identification of data points in a new dataset 812 that deviate from normal patterns of new dataset 812.

In at least one embodiment, semi-supervised learning may be used, which is a technique in which in training dataset 802 includes a mix of labeled and unlabeled data. In at least one embodiment, training framework 804 may be used to perform incremental learning, such as through transferred learning techniques. In at least one embodiment, incremental learning enables trained neural network 808 to adapt to new data 812 without forgetting knowledge instilled within network during initial training.

Data Center

Figure 9:
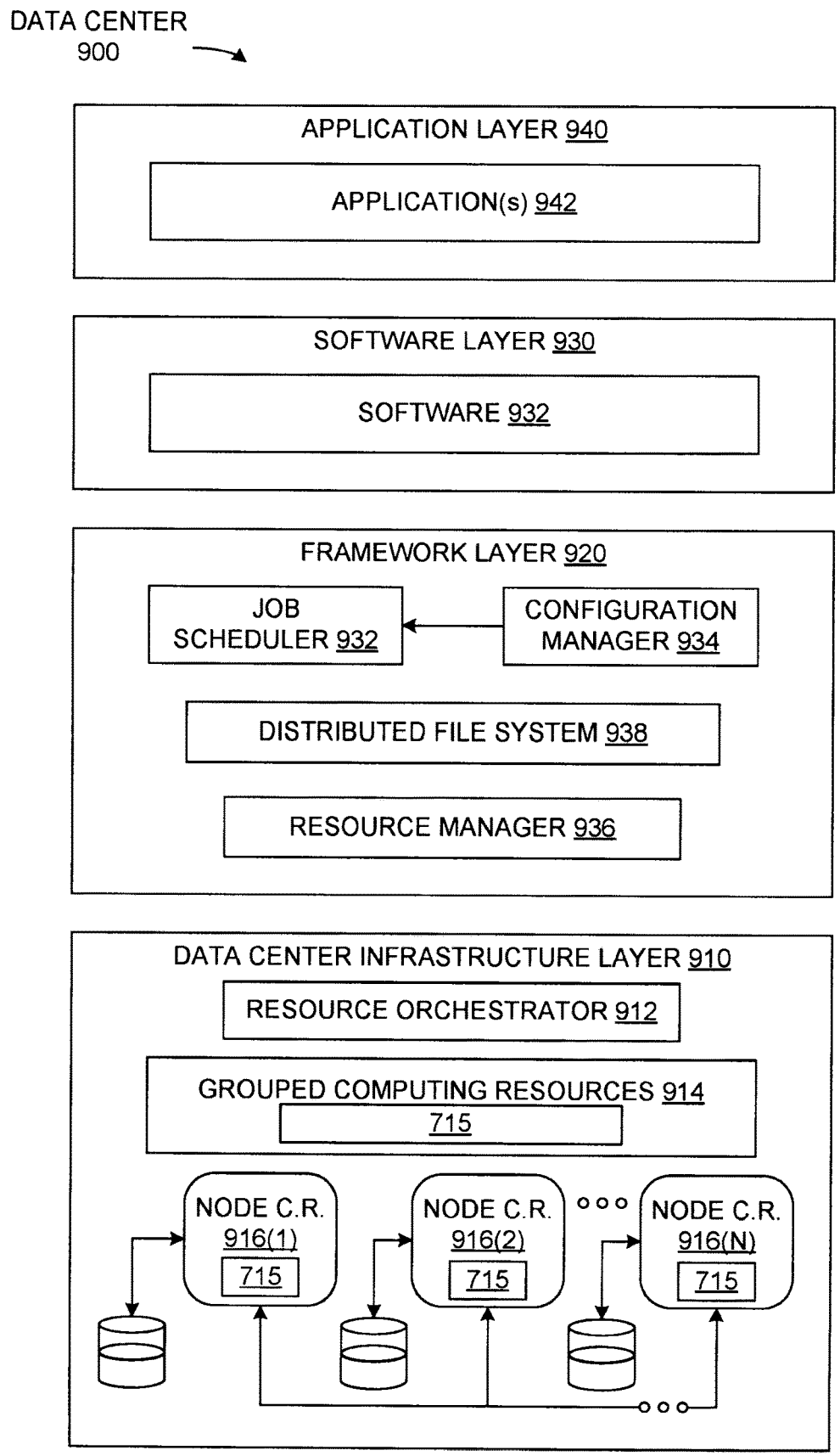
FIG. 9 illustrates an example data center system, according to at least one embodiment.

FIG. 9 illustrates an example data center 900, in which at least one embodiment may be used. In at least one embodiment, data center 900 includes a data center infrastructure layer 910, a framework layer 920, a software layer 930 and an application layer 940.

In at least one embodiment, as shown in FIG. 9, data center infrastructure layer 910 may include a resource orchestrator 912, grouped computing resources 914, and node computing resources ("node C.R.s") 916(1)-916(N), where "N" represents any whole, positive integer. In at least one embodiment, node C.R.s 916(1)-916(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 916(1)-916(N) may be a server having one or more of above-mentioned computing resources.

In at least one embodiment, grouped computing resources 914 may include separate groupings of node C.R.s housed within one or more racks (not shown), or many racks housed in data centers at various geographical locations (also not shown). Separate groupings of node C.R.s within grouped computing resources 914 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 922 may configure or otherwise control one or more node C.R.s 916(1)-916(N) and/or grouped computing resources 914. In at least one embodiment, resource orchestrator 922 may include a software design infrastructure ("SDI") management entity for data center 900. In at least one embodiment, resource orchestrator may include hardware, software or some combination thereof.

In at least one embodiment, as shown in FIG. 9, framework layer 920 includes a job scheduler 932, a configuration manager 934, a resource manager 936 and a distributed file system 938. In at least one embodiment, framework layer 920 may include a framework to support software 932 of software layer 930 and/or one or more application(s) 942 of application layer 940. In at least one embodiment, software 932 or application(s) 942 may respectively include web-based service software or applications, such as those provided by Amazon Web Services, Google Cloud and Microsoft Azure. In at least one embodiment, framework layer 920 may be, but is not limited to, a type of free and open-source software web application framework such as Apache Spark™ (hereinafter "Spark") that may utilize distributed file system 938 for large-scale data processing (e.g., "big data"). In at least one embodiment, job scheduler 932 may include a Spark driver to facilitate scheduling of workloads supported by various layers of data center 900. In at least one embodiment, configuration manager 934 may be capable of configuring different layers such as software layer 930 and framework layer 920 including Spark and distributed file system 938 for supporting large-scale data processing. In at least one embodiment, resource manager 936 may be capable of managing clustered or grouped computing resources mapped to or allocated for support of distributed file system 938 and job scheduler 932. In at least one embodiment, clustered or grouped computing resources may include grouped computing resource 914 at data center infrastructure layer 910. In at least one embodiment, resource manager 936 may coordinate with resource orchestrator 912 to manage these mapped or allocated computing resources.

In at least one embodiment, software 932 included in software layer 930 may include software used by at least portions of node C.R.s 916(1)-916(N), grouped computing resources 914, and/or distributed file system 938 of framework layer 920, one or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-916(N), grouped computing resources 914, and/or distributed file system 938 of framework layer 920, one or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 934, resource manager 936, and resource orchestrator 912 may implement any number and type of self-modifying actions based on any amount and type of data acquired in any technically feasible fashion. In at least one embodiment, self-modifying actions may relieve a data center operator of data center 900 from making possibly bad configuration decisions and possibly avoiding underutilized and/or poor performing portions of a data center.

In at least one embodiment, data center 900 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 900. In at least one embodiment, trained machine learning models corresponding to one or more neural networks may be used to infer or predict information using resources described above with respect to data center 900 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 615 are used to perform inferencing and/or training operations associated with one or more embodiments. In at least one embodiment, inference and/or training logic 615 may be used in system FIG. 9 for inferencing or predicting operations based, at least in part, on weight parameters calculated using neural network training operations, neural network functions and/or architectures, or neural network use cases described herein.

As described herein, a method, computer readable medium, and system are disclosed for collision detection for object rearrangement using a 3D scene representation. In accordance with FIGS. 1-6, embodiments may provide machine learning models usable for performing inferencing operations and for providing inferenced data. The machine learning models may be is stored (partially or wholly) in one or both of data storage 701 and 705 in inference and/or training logic 715 as depicted in FIGS. 7A and 7B. Training and deployment of the machine learning models may be performed as depicted in FIG. 8 and described herein. Distribution of the machine learning models may be performed using one or more servers in a data center 900 as depicted in FIG. 9 and described herein.

What is claimed is:

1. A method, comprising:
at a device:
processing at least one image that captures a scene of a real-world environment having a plurality of objects to learn a three-dimensional representation of the scene;
performing collision detection for at least a portion of the scene, using the three-dimensional representation of the scene, to detect intersections between two or more objects of the plurality of objects in the real-world environment;
sampling a target object from the plurality of objects, based on the detected intersections; and
predicting a plurality of waypoints for a rearrangement task that changes a position of the target object in the real-world environment, using the three-dimensional representation of the scene.

2. The method of claim 1, wherein processing the at least one image to learn the three-dimensional representation of the scene includes encoding a point cloud for the scene.

3. The method of claim 2, wherein the point cloud for the scene is encoded by voxelizing the point cloud for the scene into a plurality of voxels.

4. The method of claim 3, wherein the point cloud for the scene is encoded by applying three-dimensional convolutions to the plurality of voxels.

5. The method of claim 1, wherein the collision detection is performed using a learned collision model.

6. The method of claim 5, wherein the collision model is learned from training data that includes a plurality of scenes having:
a plurality of different objects,
a plurality of different object placements, and
a plurality of different support surfaces.

7. The method of claim 1, wherein performing collision detection for at least a portion of the scene further uses a three-dimensional representation of each object of the plurality of objects included in the at least a portion of the scene.

8. The method of claim 7, wherein the three-dimensional representation of each object is learned by processing the at least one image.

9. The method of claim 8, wherein learning the three-dimensional representation of each object includes encoding a point cloud for each object.

10. The method of claim 1, wherein the target object is sampled from the plurality of objects when it is determined, based on the collision detection, that there exists a set of ground truth robotic grasps associated with the target object which do not collide with another object of the plurality of objects and which have valid collision-free inverse kinematic configuration.

11. The method of claim 1, wherein the plurality of waypoints indicate a movement of a robotic gripper that changes the position of the target object in the real-world environment.

12. The method of claim 11, wherein changing the position of the target object includes moving the target object from a source location in the real-world environment to a target location in the real-world environment, and wherein the target location is a location in the real-world environment for which there exists a collision-free placement pose for the target object.

13. The method of claim 12, wherein the source location is a first support surface and the target location is a second support surface that is different from the first support surface.

14. The method of claim 13, wherein at least one of the first support surface or the second support surface is a shelf.

15. The method of claim 12, wherein the rearrangement task includes a defined placement orientation of the target object at the target location, and wherein the defined placement orientation is set to a current pose of the target object at the source location.

16. The method of claim 1, wherein the plurality of waypoints are predicted using a feedforward neural network that processes:
the rearrangement task corresponding to the target object,
the three-dimensional representation of the scene, and
a current position of a robotic gripper to be used for the rearrangement task.

17. The method of claim 1, wherein the plurality of waypoints are sampled based on a defined signed distance value.

18. The method of claim 1, wherein the method further comprises:
causing a robot to perform the rearrangement task according to the plurality of waypoints.

19. A system, comprising:
a non-transitory memory storage comprising instructions; and
one or more processors in communication with the non-transitory memory storage, wherein the one or more processors execute the instructions to:
process at least one image that captures a scene of a real-world environment having a plurality of objects to learn a three-dimensional representation of the scene;
perform collision detection for at least a portion of the scene, using the three-dimensional representation of the scene, to detect intersections between two or more objects of the plurality of objects in the real-world environment;
sample a target object from the plurality of objects, based on the detected intersections; and
predict a plurality of waypoints for a rearrangement task that changes a position of the target object in the real-world environment, using the three-dimensional representation of the scene.

20. A non-transitory computer-readable media storing computer instructions which when executed by one or more processors of a device cause the device to:
process at least one image that captures a scene of a real-world environment having a plurality of objects to learn a three-dimensional representation of the scene;
perform collision detection for at least a portion of the scene, using the three-dimensional representation of the scene, to detect intersections between two or more objects of the plurality of objects in the real-world environment;
sample a target object from the plurality of objects, based on the detected intersections; and
predict a plurality of waypoints for a rearrangement task that changes a position of the target object in the real-world environment, using the three-dimensional representation of the scene.

* * * * *